US006174402B1

(12) United States Patent
Nakano et al.

(10) Patent No.: US 6,174,402 B1
(45) Date of Patent: Jan. 16, 2001

(54) ADHESIVE LABEL, METHOD AND APPARATUS OF MANUFACTURING THE SAME

(75) Inventors: Shigeru Nakano; Yoki Abe, both of Tokyo-To (JP)

(73) Assignee: Dai Nippon Printing Co., Ltd. (JP)

( * ) Notice: Under 35 U.S.C. 154(b), the term of this patent shall be extended for 0 days.

(21) Appl. No.: 09/441,876

(22) Filed: Nov. 17, 1999

Related U.S. Application Data

(62) Division of application No. 08/832,556, filed on Apr. 2, 1997, now Pat. No. 6,037,027.

(30) Foreign Application Priority Data

Apr. 4, 1996 (JP) ........................................ 8-082649
Apr. 4, 1996 (JP) ........................................ 8-082652

(51) Int. Cl.[7] ........................................ B32B 31/00

(52) U.S. Cl. .................... 156/253; 156/247; 156/267; 156/268; 156/269; 156/270; 156/257; 283/70; 283/81; 283/101; 283/105; 283/109

(58) Field of Search .................... 156/247, 253, 156/267, 268, 270, 269, 257; 283/70, 81, 101, 105, 109

(56) References Cited

U.S. PATENT DOCUMENTS

| | | | | |
|---|---|---|---|---|
| 4,153,496 | * | 5/1979 | Swift | 156/384 |
| 4,328,057 | * | 5/1982 | Gutow | 156/248 |
| 4,661,189 | * | 4/1987 | Voy et al. | 156/248 |
| 4,841,712 | * | 6/1989 | Roou | 53/412 |
| 5,651,851 | * | 7/1997 | Gatcomb | 156/250 |
| 5,700,537 | * | 12/1997 | Instance | 428/41.9 |
| 5,773,111 | | 6/1998 | Brewster | 428/42.2 |

FOREIGN PATENT DOCUMENTS

| | | |
|---|---|---|
| 3724267 | 2/1989 | (DE) . |
| 4135492 | 4/1993 | (DE) . |
| 4302814 | 10/1993 | (DE) . |
| 29506052 | 6/1996 | (DE) . |
| 0628405 | 12/1994 | (EP) . |
| 0688008 | 12/1995 | (EP) . |

* cited by examiner

*Primary Examiner*—Linda L. Gray

(57) ABSTRACT

A releasing agent is applied to opposite side edge portions of a tack sheet to form releasing regions. A laminated sheet provided with an adhesive layer having exposed opposite side edge portions is overlaid on the tack sheet. The laminated sheet is bonded to the tack sheet through portions of the adhesive layer not corresponding to the releasing regions. The laminated sheet is punched to form a plurality of divisions, and the divisions are bonded to the tack sheet by the portions of the adhesive layer not corresponding to the releasing regions. Portions having a desired figure of the tack sheet are punched out to provide adhesive labels.

7 Claims, 4 Drawing Sheets

ADHESIVE LABEL, METHOD AND APPARATUS OF MANUFACTURING THE SAME

This is a Division of application Ser. No. 08/832,556 filed Apr. 2, 1997, now U.S. Pat. No. 6,037,027.

BACKGROUND OF THE INVENTION

1. Field of the Invention

The present invention relates to an adhesive label formed by adhesively attaching a laminated sheet consisting of a transparent film and a second separator to a tack sheet consisting of a writable base sheet and a first separator, a method of manufacturing the adhesive label, and an apparatus for carrying out the method to manufacturing the adhesive label.

2. Description of the Related Art

There has been known an adhesive label formed by adhesively attaching a laminated sheet consisting of a transparent film and a second separator to a tack sheet consisting of a writable base sheet and a first separator.

When using this known adhesive label, the laminated sheet is raised from the tack sheet, and necessary matters are written on the writable base sheet of the tack sheet. Then, the second separator of the laminated sheet is separated from the transparent film, and the transparent film is attached adhesively to the base sheet of the tack sheet. Then, the transparent film and the base sheet are separated from the first separator, and the back surface of the base sheet is attached adhesively to an article, such as a disk case.

In this adhesive label, the first separator of the tack sheet has a relatively large area, while the base sheet has a relatively small area. Therefore, the writable base sheet cannot effectively be used, and a step formed between the first separator and the base sheet spoils the appearance.

SUMMARY OF THE INVENTION

The present invention has been made in view of such problems and it is therefore an object of the present invention to provide an adhesive label having a first separator and a base sheet respectively having substantially equal areas, allowing the effective use of the base sheet, and not having any step between the first separator and the base sheet.

Another object of the present invention is to provide a method of manufacturing an adhesive label having a first separator and a base sheet respectively having substantially equal areas, allowing the effective use of the base sheet, and not having any step between the first separator and the base sheet, in such an adhesive label.

A further object of the present invention is to provide an apparatus for manufacturing an adhesive label having a first separator and a base sheet respectively having substantially equal areas, allowing the effective use of the base sheet, and not having any step between the first separator and the base sheet.

According to a first aspect of the present invention, an adhesive label comprises a tack sheet having a base sheet and a first separator adhesively attached to the base sheet with a first adhesive layer so that the edges of the first separator coincide with the corresponding edges of the base sheet, respectively; and a laminated sheet having a transparent film and a second separator adhesively attached to a transparent film with a second adhesive layer. The laminated sheet has an external figure smaller than that of the tack sheet, an adhesive region in which the second adhesive layer is exposed is formed in a portion of the laminated sheet by removing a portion of the second separator, the laminated sheet is attached adhesively to the base sheet of the tack sheet by the adhesive region, and a first cut of a figure corresponding to the external figure of the laminated sheet is formed in the tack sheet so as to penetrate the base sheet and reach the first separator.

According to a second aspect of the present invention, an adhesive label manufacturing method comprises steps of feeding a tack sheet having a base sheet and a first separator adhesively attached to the base sheet with a first adhesive layer; forming releasing regions in the opposite side edge portions of the base sheet of the tack sheet by applying a release agent to the opposite side edge portions; overlaying a laminated sheet having a transparent film and a second separator adhesively attached to the transparent film with a second adhesive layer, on the tack sheet having the opposite side edge portions coated with the release agent, with the second separator having removed opposite side edge portions thereof and facing to the base sheet; punching the laminated sheet to divide the laminated sheet into a plurality of divisions and removing a slug of the laminated sheet; and punching out portions of the tack sheet including the divisions to provide individual adhesive labels and removing a slug of the tack sheet between the individual adhesive labels.

According to a third aspect of the present invention, an adhesive label manufacturing apparatus comprises: a tack sheet feed unit for feeding a tack sheet having a base sheet and a first separator adhesively attached to the base sheet with a first adhesive layer; a releasing region forming unit for forming releasing regions in the opposite side edge portions of the base sheet of the tack sheet by applying a release agent to the opposite side edge portions; a sheet overlaying unit for overlaying a laminated sheet having a transparent film and a second separator adhesively attached to the transparent film with a first adhesive layer, on the tack sheet having portions coated with the release agent, with the second separator having removed opposite side edge portions thereof and facing the base sheet; a first punching unit for punching the laminated sheet so as to divide the laminated sheet into a plurality of divisions and removing a slug of the laminated sheet; and a second punching unit for punching out portions of the tack sheet including the divisions to provide individual adhesive labels and removing a slug of the tack sheet between the individual adhesive labels.

According to the first aspect of the present invention, the laminated sheet is attached adhesively to the base sheet of the tack sheet by the exposed portions of the second adhesive layer, and the first cut of a figure corresponding to the external figure of the laminated sheet is formed in the base sheet of the tack sheet so as to reach the first separator. Therefore, the second separator is separated from the transparent film after writing necessary matters on the base sheet of the tack sheet, and the transparent film is attached adhesively to the base sheet. Then, the base sheet to which the transparent film is attached adhesively is removed along the first cut from the first separator, and then the base sheet is attached adhesively to an article by the first adhesive layer. Since the respective outer edges of the base sheet and the first separator coincide with each other, the base sheet can effectively be used and any step is not formed between the base sheet and the first separator.

According to the second and the third aspects of the present invention, the releasing agent is applied to the opposite side edge portions of the base sheet of the tack sheet to form the releasing regions, and the laminated sheet having the second separator having removed opposite side edge portions is overlaid on the tack sheet to attach adhesively the opposite side edge portions of the laminated sheet to the tack sheet. After forming the plurality of individual sections by punching the laminated sheet, portions of the tack sheet having a figure corresponding to the external figure of an adhesive label are punched out to obtain individual adhesive labels.

BRIEF DESCRIPTION OF THE DRAWINGS

FIG. 6(*b*) is a side view of an adhesive label.

DETAILED DESCRIPTION OF THE PREFERRED EMBODIMENTS

Preferred embodiments of the present invention will be described hereinafter with reference to the accompanying drawings, in which FIGS. 1 to 6 show an adhesive label in accordance with the present invention, a method of manufacturing the adhesive label, and a manufacturing apparatus for carrying out the method.

Figure 1:
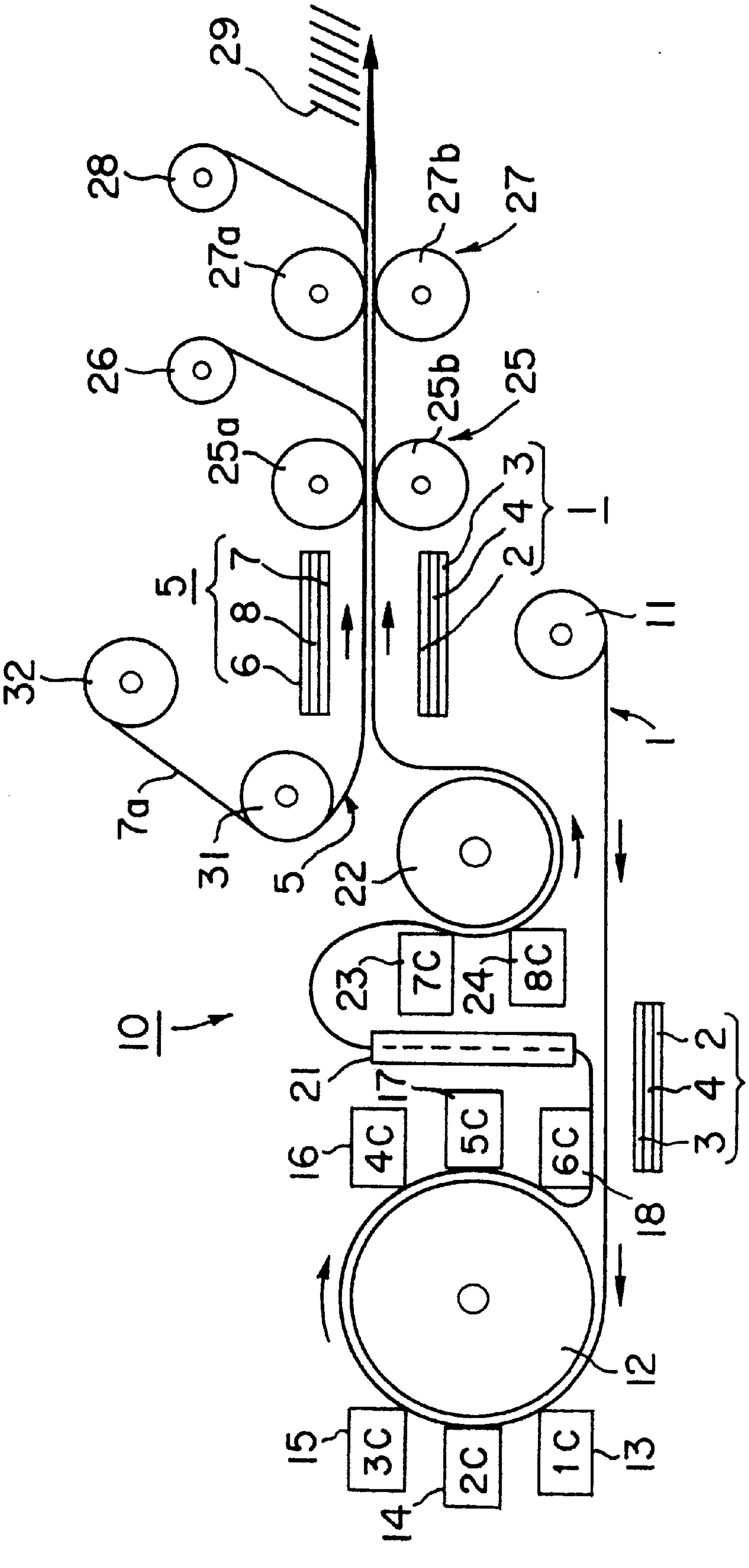
FIG. 1 is a schematic side view of an adhesive label manufacturing apparatus according to the present invention.
Figure 2:
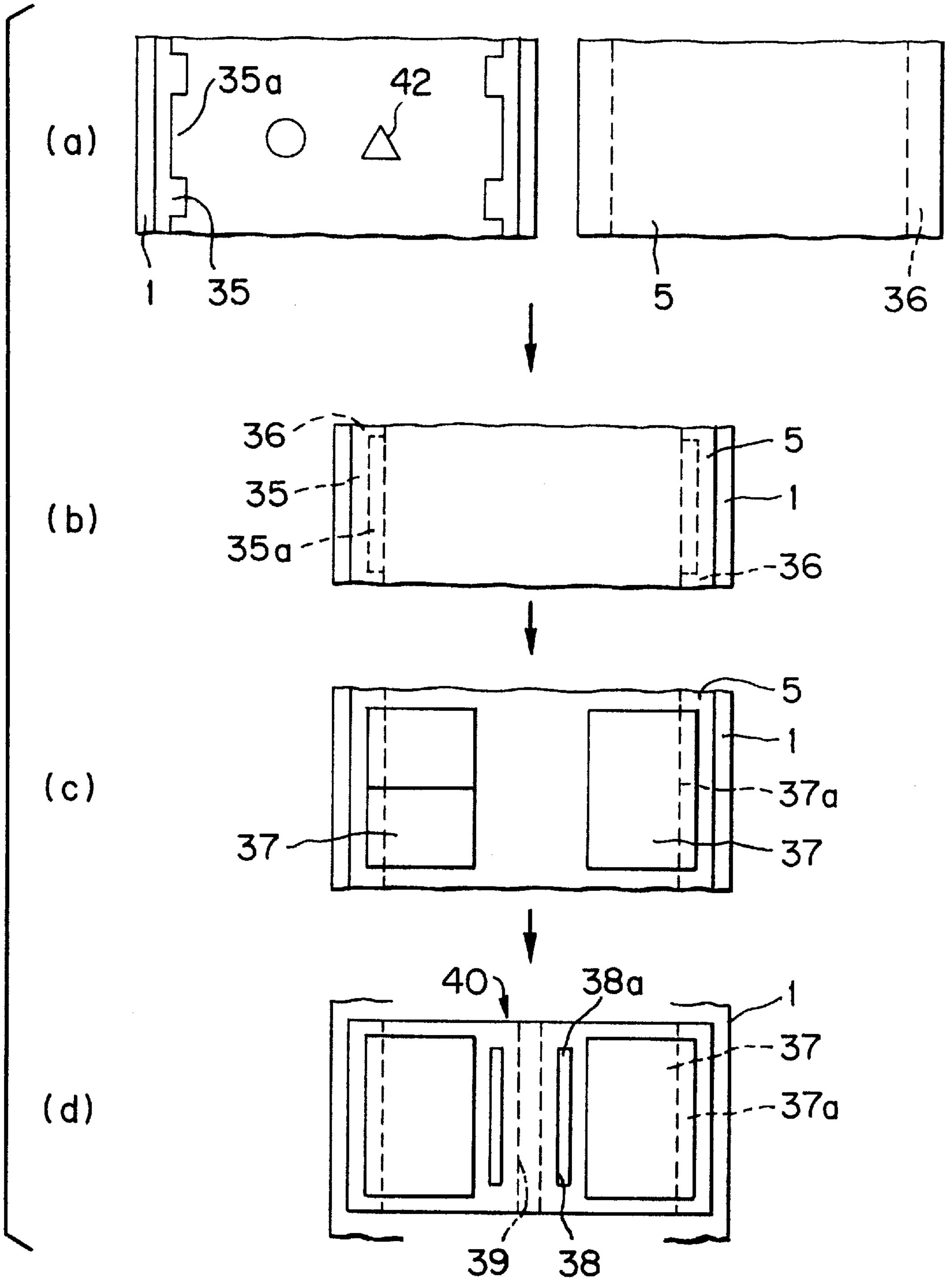
FIG. 2 shows schematic plan views of assistance in explaining an adhesive label manufacturing method in accordance with the present invention.
Figure 6A:
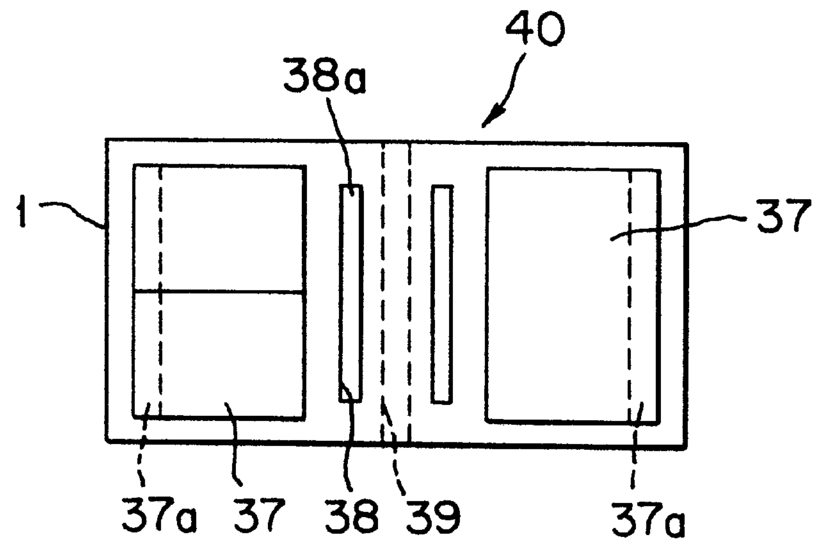
FIG. 6(*a*) is a plan view of an adhesive label.
Figure 6B:
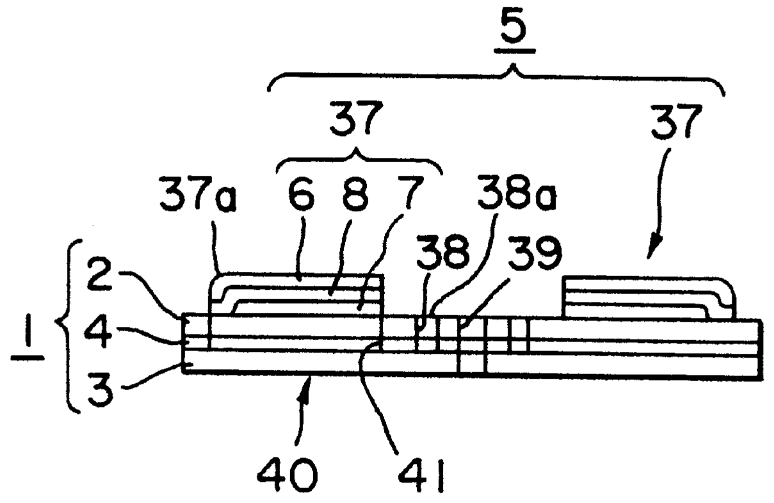

An adhesive label to be manufactured by an adhesive label manufacturing method and an adhesive label manufacturing apparatus in accordance with the present invention will briefly be described with reference to FIGS. 6(*a*) and 6(*b*). FIG. 6(*a*) is a plan view of an adhesive label and FIG. 6(*b*) is a side view of the adhesive label of FIG. 6(*a*). As shown in FIGS. 6(*a*) and 6(*b*), an adhesive label 40 has a tack sheet 1 and a laminated sheet 5 attached to the tack sheet 1 (FIG. 2). The laminated sheet 5 is divided into a plurality of divisions 37. The laminated sheet 5 need not necessarily be divided. The tack sheet 1 has a base sheet 2, such as a synthetic paper sheet, and a first separator 3, such as a synthetic paper sheet, adhesively attached to the base sheet 2 with a first adhesive layer 4 (FIG. 1). The base sheet 2 and the first separator 3 are the same in external figure, and the base sheet 2 and the first separator 3 are put together so that their corresponding edges coincide with each other. The laminated sheet 5 has a transparent film 6 of a synthetic resin, such as a polypropylene resin, a polystyrene resin or a polyethylene terephthalate resin, and a second separator 7 adhesively attached to the transparent film 6 with a second adhesive layer 8 (FIG. 1).

As shown in FIGS. 6(*a*) and 6(*b*), the external figure of the divisions 37 of the laminated sheet 5 are smaller than that of the tack sheet 1. Each division 37 has an adhesive portion 37*a* and the second separator 7 has no portion underlying the adhesive portion 37*a*. The adhesive portion 37*a* corresponds to a portion of the adhesive layer 8 to be exposed. The adhesive portion 37*a* of each division 37 is attached adhesively to the tack sheet 1. Since only the adhesive portion 37*a* of each division 37 is attached adhesively to the tack sheet 1, the rest of the division 37 other than the adhesive portion 37*a* can be raised from the tack sheet 1. As shown in FIG. 6(*b*), a first cut 41 of a figure corresponding to that of the division 37 is formed in the tack sheet 1 so as to penetrate the base sheet 2 and reach the first separator 3. Second cuts 38 penetrating the base sheet 2 and reaching the first separator 3 are also formed in portions of the tack sheet 1 not including the divisions 37 to define writing portions 38*a*. Perforations 39 are formed in the tack sheet 1.

The first cut 41 is formed to separate the base sheet 2 and the adhesive layer 4 together with the division 37 from the first separator 3. The second cut 38 is formed to separate a portion of the base sheet 2 and a portion of the adhesive layer 4 corresponding to the writing portion 38*a* from the first separator 3 after writing characters on the surface of the writing portion 38*a* of the base sheet 2.

When using the adhesive label shown in FIGS. 6(*a*) and 6(*b*), the division 37 is raised from the tack sheet 1, and desired information is written on the base sheet 2 of the tack sheet 1. Subsequently, the second separator 7 is separated from the division 37, and the transparent film 6 is attached adhesively to the base sheet 2 of the tack sheet 1. The base sheet 2 and the adhesive layer 4 is separated together with the transparent film 6 along the first cut 41 from the first separator 3, and then the base sheet 2 coated with the transparent film 6 is attached adhesively by the adhesive layer 4 to a surface of an article, not shown, such as a disk case. In the adhesive label 40 shown in FIGS. 6(*a*) and 6(*b*), the base sheet 2 and the first separator 3 are substantially the same in figure.

An adhesive label manufacturing apparatus 10 will be described hereinafter with reference to FIG. 1. Referring to FIG. 1, the adhesive label manufacturing apparatus 10 comprises a tack sheet feed unit 11 for feeding a tack sheet 1, a printing drum 12 for printing on the base sheet 2 forming the tack sheet 1, a damper 21 for regulating feed speed of the tack sheet 1, and a printing drum 22 for printing on the first separator 3 included in the tack sheet 1.

Printing units 13, 14, 15, 16, 17 and 18 for multicolor printing are arranged sequentially around the printing drum 12. The printing unit 14 applies a releasing agent, such as silicone, to the opposite edge portions of the base sheet 2 of the tack sheet 1 to form releasing regions 35 (FIG. 2(*a*)). The printing units 13, 15, 16, 17 and 18 are used for printing desired multicolor image 42 on the base sheet 2 (FIG. 2(*a*)).

Printing units 23 and 24 for multicolor printing are arranged sequentially around the printing drum 22. The tack sheet 1 delivered by the printing drum 22 and a laminated sheet 5 unwound from a laminated sheet roll 31 are put together. Opposite edge portions 7*a* of the second separator 7 composing the laminated sheet 5 are removed from the laminated sheet 5 and taken up on a slug roll 32. A first punching unit 25 having an upper roller 25*a* and a lower roller 25*b*, and a second punching unit 27 having an upper roller 27*a* and a lower roller 27*b* are arranged downstream in that order behind the printing drum 22 and the laminated sheet roll 31. The first punching unit 25 punches the laminated sheet 5 to form divisions 37 in the laminated sheet 5. The second punching unit 27 punches out portions of the tack sheet 1 in a predetermined figure to provide adhesive labels 40 of the predetermined figure. A slug of the laminated sheet 5 produced by punching the laminated sheet 5 by the first punching unit 25 is taken up on a slug roll 26, and a slug of the tack sheet 1 produced by punching the tack sheet 1 by the second punching unit 27 is taken up on a slug roll 28. The individual adhesive labels 40 punched out by the second punching unit 27 are collected in a storage unit 29.

An adhesive label manufacturing method for manufacturing the adhesive labels 40 will be described hereinafter. Referring to FIG. 1, the tack sheet feed unit 11 feeds the tack sheet 1. The printing units 13, 15, 16, 17 and 18 print the desired multicolor image 42 (FIG. 2(*a*)) on the base sheet 2 of the tack sheet 1 wound around the printing drum 12. At the same time, the printing unit 14 applies a releasing agent, such as silicone, to the opposite side edge portions of the base sheet 2 of the tack sheet 1 to form the pair of elongate releasing regions 35 on the base sheet 2. Recesses 35*a* are formed in the inner sides of the releasing regions 35. The recesses 35*a* correspond to the adhesive portions 37*a* of the divisions 37 of the laminated sheet 5.

The tack sheet 1 advances through the damper 21 to the printing drum 22. Then, the printing units 23 and 24 print a multicolor image on the first separator 3 of the tack sheet 1, and the laminated sheet 5 unwound from the laminated sheet roll 31 is put on the base sheet 2 of the tack sheet 1 (FIG. 2(*a*)). The opposite side edge portions 7*a* of the second separator 7 of the laminated sheet 5 corresponding to the releasing regions 35 of the tack sheet 1 are removed from the laminated sheet 5 to expose opposite edge portions 36 of the adhesive layer 8; that is, the edge portions 36 of the adhesive layer 8 of the laminated sheet 5 are exposed, and the side edge portions 7*a* of the second separator 7, i.e., slugs, are taken up on the slug roll 32.

Subsequently, the laminated sheet 5 unwound from the laminated sheet roll 31 and the tack sheet 1 delivered from the printing roller 22 are put together so that the base sheet 2 is in contact with the second separator 7 (FIG. 2(*b*)). The edge portions 36 of the adhesive layer 8 are exposed in the opposite side edge portions of the laminated sheet 5, and the outer edges of the exposed edge portions 36 of the adhesive layer 8 coincide with the corresponding side edges of the releasing regions 35 of the tack sheet 1. Areas of the edge portions 36 of the adhesive layer 8 of the laminated sheet 5 in contact with the releasing regions 35 do not adhere to the tack sheet 1, and areas of the edge portions 36 corresponding to the recesses 35*a* formed in the inner sides of the releasing regions 35 adhere to the tack sheet 1.

Figure 3:
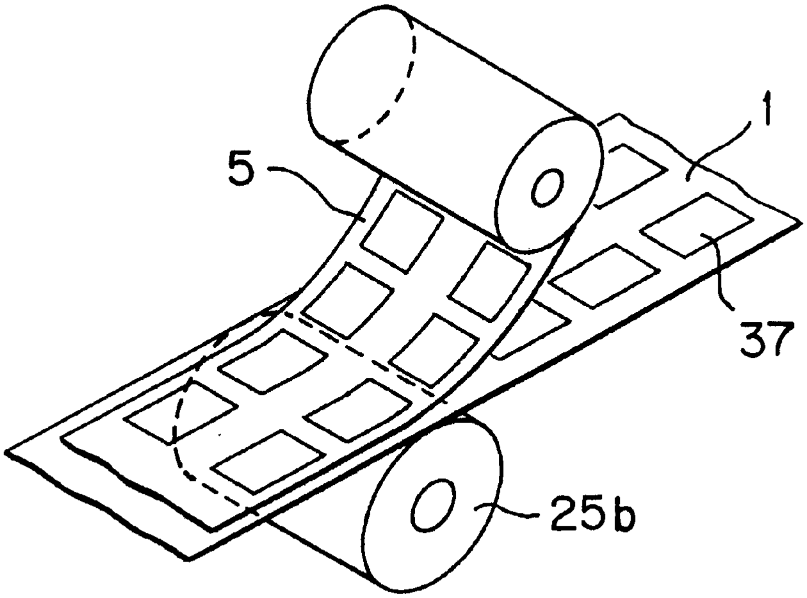
FIG. 3 is a perspective view of assistance in explaining an operation for taking up a punched laminated sheet.
Figure 4:
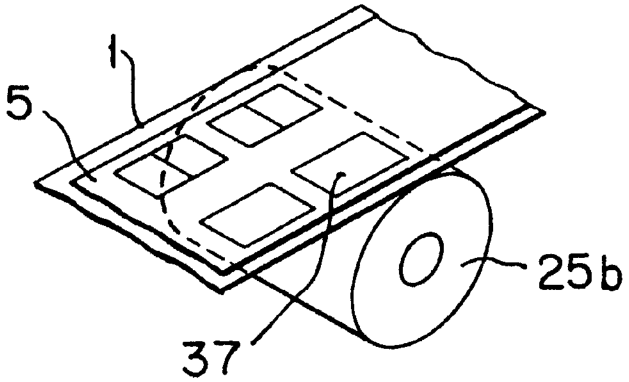
FIG. 4 is a perspective view of assistance in explaining actions of a first punching roller.
Figure 5:
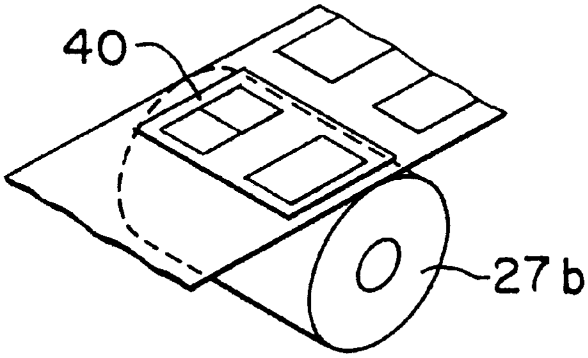
FIG. 5 is a perspective view of assistance in explaining actions of a second punching roller.

The tack sheet 1 and the laminated sheet 5 thus joined together one on top of the other advance to the first punching unit 25. The first punching unit 25 forms cuts in the laminated sheet 5 to form the plurality of divisions 37 in the laminated sheet 5 (FIGS. 2(*c*) and 4). The divisions 37 are bonded to the tack sheet 1 by the adhesive portions 37*a* adhering to portions of the tack sheet 1 corresponding to the recesses 35*a*. The first punching unit 25 forms also the cuts 41 in the tack sheet 1 so as to penetrate through the base sheet 2 and reach the first separator 3 simultaneously with the formation of the cuts in the laminated sheet 5. A slug of the laminated sheet 5 punched by the first punching unit 25 is taken up on a slug roll 26 (FIG. 3). Although the divisions 37 of the laminated sheet 5 are bonded to the tack sheet 1 by the adhesive portions 37*a,* the slug of the laminated sheet 5 to be taken up on the slug roll 26 does not have any portion bonded to the tack sheet 1, because each adhesive portion 37*a* is a portion of the punched division 37 and remaining on the tack sheet 1. Therefore, the slug of the laminated sheet 5 punched by the first punching unit 25 can easily be taken up on the slug roll 26.

The tack sheet 1 carrying the divisions 37 thereon advances to the second punching unit 27, and the second punching unit 27 punches out portions of the tack sheet 1 respectively having the divisions 37 to provide the individual adhesive labels 40 (FIGS. 2(*d*) and 5). When punching out the adhesive labels 40 from the tack sheet 1 by the second punching unit 27, the cuts 38 along which the base sheet 2 and the adhesive layer 4 are separated from the first separator 3 and the perforations 39 penetrating the base sheet 2, the adhesive layer 4 and the first separator 3 are formed simultaneously. Thus, the adhesive labels 40 shown in FIGS. 6(*a*) and 6(*b*) are produced. The adhesive labels 40 are stacked in the storage unit 29.

Thus, the adhesive labels 40 each having the base sheet 2 and the first separator 3 which are the same in figure can easily and continuously be manufactured.

As is apparent from the foregoing description, according to the present invention, the base sheet is used effectively and any unnecessary step is not formed between the base sheet and the first separator, because the corresponding edges of the base sheet and the first separator coincide with each other. The adhesive label having the tack sheet, and the division of the laminated sheet partially and adhesively attached to the tack sheet can easily be manufactured.

What is claimed is:

1. An adhesive label manufacturing method comprising steps of:

feeding a tack sheet having a base sheet and a first separator adhesively attached to the base sheet with a first adhesive layer;

forming releasing regions in the opposite side edge portions of the base sheet of the tack sheet by applying a release agent to the opposite side edge portions of the base sheet;

overlaying a laminated sheet having a transparent film and a second separator adhesively attached to the transparent film with a second adhesive layer, on the tack sheet having the opposite side edge portions coated with the release agent, with the second separator having removed opposite side edge portions thereof and facing to the base sheet;

punching the laminated sheet to divide the laminated sheet into a plurality of divisions and removing a slug of the laminated sheet; and punching out portions of the tack sheet including the divisions to provide individual adhesive labels and removing a slug of the tack sheet between the individual adhesive labels.

2. The adhesive label manufacturing method according to claim 1, wherein the releasing agent is applied to the opposite side edge portions of the base sheet along lines defining the external figures of regions corresponding to the divisions of the laminated sheet to form a pair of elongate releasing regions.

3. The adhesive label manufacturing method according to claim 2, wherein recesses corresponding to the divisions of the laminated sheet are formed in the inner sides of the pair of elongate releasing regions, respectively.

4. The adhesive label manufacturing method according to claim 2, wherein the pair of elongate releasing regions are formed so that outer ends thereof coincide with outer ends of the second adhesive layer, and the inner ends thereof coincide with outer ends of the second separator.

5. The adhesive label manufacturing method according to claim 1, wherein first cuts are formed in the tack sheet by punching the laminated sheet, and the base sheet and the first adhesive layer of the tack sheet when dividing the laminated sheet into the plurality of divisions.

6. The adhesive label manufacturing method according to claim 1, wherein second cuts are formed by punching the base sheet and the first adhesive layer to form writing areas in the tack sheet when punching out individual adhesive labels from the tack sheet.

7. The adhesive label manufacturing method according to claim 1, wherein perforations are formed by punching the base sheet, the first adhesive layer and the first separator when punching out individual adhesive labels from the tack sheet.

* * * * *